(12) United States Patent
Rohrer

(10) Patent No.: US 8,581,432 B2
(45) Date of Patent: Nov. 12, 2013

(54) OCEAN WAVE ENERGY CONVERTER CAPTURING HEAVE, SURGE AND PITCH MOTION

(75) Inventor: John W. Rohrer, York, ME (US)

(73) Assignee: Rohrer Technologies, Inc., York, ME (US)

(*) Notice: Subject to any disclaimer, the term of this patent is extended or adjusted under 35 U.S.C. 154(b) by 696 days.

(21) Appl. No.: 12/802,018

(22) Filed: May 27, 2010

(65) Prior Publication Data

US 2010/0308590 A1    Dec. 9, 2010

Related U.S. Application Data

(63) Continuation-in-part of application No. 12/454,984, filed on May 27, 2009, now abandoned.

(51) Int. Cl.
    *F03B 13/10*    (2006.01)
    *F03B 13/12*    (2006.01)

(52) U.S. Cl.
    USPC ............................................. 290/53; 290/42

(58) Field of Classification Search
    USPC .......................... 290/42, 43, 53, 54
    See application file for complete search history.

(56) References Cited

U.S. PATENT DOCUMENTS

| | | | | |
|---|---|---|---|---|
| 3,353,787 A | 11/1967 | Semo | | 253/4 |
| 4,375,151 A | 3/1983 | French | | 60/398 |
| 4,630,440 A | 12/1986 | Meyerand | | 60/398 |
| 5,329,497 A | 7/1994 | Previsic | | 367/41 |
| 5,349,819 A | 9/1994 | Margittai | | 60/398 |
| 5,473,892 A | 12/1995 | Margittai | | 60/398 |
| 5,909,060 A | 6/1999 | Gardner | | 290/53 |
| 6,291,904 B1 | 9/2001 | Carroll | | 290/53 |
| 6,392,314 B1* | 5/2002 | Dick | | 290/53 |
| 6,700,217 B1 | 3/2004 | North | | 290/53 |
| 6,772,592 B2 | 8/2004 | Gerber | | 60/495 |
| 6,933,623 B2* | 8/2005 | Carroll et al. | | 290/42 |
| 7,245,041 B1* | 7/2007 | Olson | | 290/53 |

(Continued)

FOREIGN PATENT DOCUMENTS

| | | |
|---|---|---|
| WO | WO 97/37123 | 2/1997 |
| WO | WO 01/06119 A1 | 1/2001 |

OTHER PUBLICATIONS

Oct. 29-Nov. 11 "The Engineer" (pp. 26-27 entitled "New Wave"), enclosed, May 23, 2009.

(Continued)

*Primary Examiner* — Nicholas Ponomarenko
(74) *Attorney, Agent, or Firm* — Mark D. Lorussso

(57) ABSTRACT

An ocean wave energy device uses large gas filled and surface vented or partially evacuated flexible containers each having rigid movable ends and rigid fixed depth ends connected by flexible bellows, suitably reinforced against external hydrostatic pressure, submerged to a depth below anticipated wave troughs. One or more said containers compress and expand as waves and troughs, respectively, pass overhead driving hydraulic or pneumatic, pumping means producing pressurized fluid flow for a common sea bed motor-generator or for other uses or on-board direct drive generators. Mechanical, hydraulic or pneumatic means re-expand said containers when a wave trough is overhead. Power output is augmented by mechanically connecting said rigid moving surfaces to surface floats, which may also provide said submerged container venting such that as waves lift and troughs lower said floats, said containers are further compressed and re-expanded, respectively. Power output is further augmented by wave kinetic energy capture through focusing, reflection and refraction.

20 Claims, 9 Drawing Sheets

(56) References Cited

U.S. PATENT DOCUMENTS

| | | | | |
|---|---|---|---|---|
| 7,385,301 B2 * | 6/2008 | Hirsch | | 290/42 |
| 7,391,127 B2 | 6/2008 | Ayntrazi | | 290/53 |
| 7,632,041 B2 * | 12/2009 | Jean et al. | | 405/76 |
| 7,737,572 B2 * | 6/2010 | Welch et al. | | 290/53 |
| 7,808,120 B2 * | 10/2010 | Smith | | 290/42 |
| 7,969,029 B2 * | 6/2011 | Vitagliano | | 290/1 R |
| 7,969,033 B2 * | 6/2011 | Ryan | | 290/53 |
| 8,093,736 B2 * | 1/2012 | Raftery | | 290/42 |
| 2006/0090463 A1 | 5/2006 | Burns | | 60/495 |
| 2007/0253841 A1 | 11/2007 | Burns | | 417/32 |
| 2008/0019847 A1 | 1/2008 | Burns | | 417/30 |
| 2008/0050178 A1 | 2/2008 | Erlingsson | | 405/21 |
| 2010/0308589 A1 * | 12/2010 | Rohrer | | 290/53 |

OTHER PUBLICATIONS

*Ocean Wave Energy Conversion*, McCormick, M.E., Dover Publications, Inc., pp. 117-122, pub. 2007.

* cited by examiner

US 8,581,432 B2

OCEAN WAVE ENERGY CONVERTER CAPTURING HEAVE, SURGE AND PITCH MOTION

RELATED U.S. APPLICATION DATA

Continuation-in-Part of U.S. application Ser. No. 12/454,984 filed on May 27, 2009 now abandoned, incorporated herein by reference.

FIELD OF INVENTION

This invention relates to devices for producing electrical power, pressurized water or other useful work from surface waves on a water body.

More particularly, this invention relates to wave energy converters wherein either all or a substantial portion of the energy captured or produced is from one or more submerged devices relying on overhead wave induced subsurface differences in hydrostatic pressure and/or enhanced surge or pitch which expand and contract or otherwise deform or deflect one or more gas filled submerged containers, thereby producing useful work. Such expansion and contraction is enhanced or supplemented by wave focusing, reflection or diffraction techniques and/or by overhead surface floating bodies.

BACKGROUND OF THE INVENTION

Wave energy commercialization lags well behind wind energy despite the fact that water is several hundred times denser than air and waves remain for days and even weeks after the wind which originally produced them has subsided. Waves, therefore, efficiently store wind kinetic energy at much higher energy densities, typically averaging up to 50 to 100 kw/m of wave front in many northern latitudes.

Hundreds of uniquely different ocean wave energy converters (OWECs) have been proposed over the last century and are described in the patent and commercial literature. Less than a dozen OWEC designs are currently deployed as "commercial proto-types." Virtually all of these suffer from high cost per average unit of energy capture. This is primarily due to the use of heavy steel construction necessary for severe sea-state survivability combined with (and in part causing) low wave energy capture efficiency. Only about 10% of currently proposed OWEC designs are deployed subsurface where severe sea-state problems are substantially reduced. Most subsurface OWECs are, unfortunately, designed for near shore sea bed deployment. Ocean waves lose substantial energy as they approach shore (due to breaking or reflected wave and bottom and hydrodynamic friction effects). Near shore submerged sea bed OWECs must be deployed at greater depths relative to average wave trough depths due to severe sea-state considerations to avoid breaking wave turbulence, and depth can not be adjusted for the large tidal depth variations found at the higher latitudes where average annual wave heights are greatest. Wave induced subsurface static pressure oscillations diminish more rapidly in shallow water as the depth below waves or swell troughs increases.

Only a few prior art subsurface devices use gas filled or evacuated containers like the present invention, producing container deformation in response to overhead swell and trough induced static pressure changes. None of the prior art subsurface OWECs capture both hydrostatic (heave) and hydrokinetic wave energy (surge or pitch) which represents half of all wave energy. None of these prior art subsurface OWECs enhance or supplement energy capture with overhead floating bodies. All of the prior subsurface deformable container OWECs suffer from high mass (and therefore cost) and low energy capture efficiency (even more cost) usually due to near shore or sea bed deployment and high mass. None of these have the tidal and sea-state depth adjustability of the present invention needed for enhanced energy capture efficiency and severe sea-state survivability. None have the low moving mass (allowing both short wave and long swell energy capture) and the large deformation stroke (relative to wave height) needed for high capture efficiency of the present invention.

At least two prior art devices use two variable volume gas filled containers, working in tandem, to drive a hydraulic turbine or motor. Gardner (U.S. Pat. No. 5,909,060) describes two sea bed deployed gas filled submerged inverted cup shaped open bottom containers laterally spaced at the expected average wavelength. The inverted cups are rigidly attached to each other at the tops by a duct. The cups rise and fall as overhead waves create static pressure differences, alternately increasing and decreasing the gas volume and hence buoyancy in each. The rise of one container and concurrent fall of the other (called an "Archemedes Wave Swing") is converted into hydraulic work by pumps driven by said swing.

Similarly, Van Den Berg (WO/1997/037123 and FIG. 1) uses two sea bed deployed submerged average wavelength spaced interconnected pistons, sealed to underlying gas filled cylinders by diaphragms. Submerged gas filled accumulators connected to each cylinder allow greater piston travel and hence work. The reciprocating pistons respond to overhead wave induced hydrostatic pressure differences producing pressurized hydraulic fluid flow for hydraulic turbines or motors.

The twin vessel Archemedes Wave Swing ("AWS") of Gardner (U.S. Pat. No. 5,909,060) later evolved into a single open bottomed vessel (FIG. 2) and then more recently Gardner's licensee, AWS Ocean Energy has disclosed an enclosed gas filled vessel (an inverted rigid massive steel cup sliding over a second upright steel cup) under partial vacuum (FIG. 3). Partial vacuum, allowing increased stroke, is maintained via an undisclosed proprietary "flexible rolling membrane seal" between the two concentric cups. Power is produced by a linear generator (FIG. 2 shown) or hydraulic pump driven by the rigid inverted moving upper cup. An elaborate external frame with rails and rollers, subject to fouling from ocean debris, is required to maintain concentricity and preserve the fragile membrane.

FIG. 4 (Burns U.S. 2008/0019847A1) shows a submerged sea bed mounted gas filled rigid cylindrical container with a rigid circular disc top connected by a small diaphragm seal. The disc top goes up and down in a very short stroke in response to overhead wave induced static pressure changes and drives a hydraulic pump via stroke reducing, force increasing actuation levers. Burns recognizes the stroke and efficiency limitations of using wave induced hydrostatic pressure variations to compress a gas in a submerged container and attempts to overcome same by arranging multiple gas interconnected containers perpendicular to oncoming wave fronts. North (U.S. Pat. No. 6,700,217) describes a similar device. Both are sea bed and near shore mounted and neither is evacuated or surface vented like the present invention to increase stroke and, therefore, efficiency.

FIG. 5 (Meyerand U.S. Pat. No. 4,630,440) uses a pressurized gas filled device which expands and contracts an unreinforced bladder within a fixed volume sea bed deployed rigid container in response to overhead wave induced static pressure changes. Bladder expansion and contraction within the container displaces sea water through a container opening driving a hydraulic turbine as sea water enters and exits the container. Expansion and contraction of the submerged bladder is enhanced via an above surface (shore mounted) diaphragm or bellows. High gas pressure is required to reinflate the submerged bladder against hydrostatic pressure.

DISCLOSURE OF THE PRESENT INVENTION

According to embodiments of the present invention, one or more gas tight containers are submerged to a depth slightly below anticipated wave and swell troughs. The container(s) have a fixed depth rigid end or surface held at relatively fixed depth relative to the water body mean water level or wave troughs by either a flexible anchoring means, with horizontal depth stabilization discs or drag plates, or by a rigid sea bed attached spar or mast, or the bottom itself. A second movable rigid end or surface opposes said first fixed end or surface. Said fixed and movable ends are separated and connected by and sealed to a flexible, gas tight, reinforced, elastomer or flexible metal bellows, or a diaphragm or accordion pleated skirt also suitably reinforced against collapse from container internal vacuum or external hydrostatic pressure. Overhead waves and troughs produce hydrostatic pressure variations which compress and expand said containers, respectively, bringing said movable end closer to and further from said fixed depth end. Container expansion and contraction (or "stroke") is enhanced by either partial evacuation of said container or venting of said containers' gas to a floating surface atmospheric vent or to a floating surface expandable bellows or bladder, or reservoir. Without said partial evacuation or atmospheric venting, said stroke and hence energy capture would be reduced several fold. The relative linear motion between said containers' fixed and movable ends is connected to and transferred to a hydraulic or pneumatic pumping means or, mechanical or electrical drive means. The pressurized fluid flow from said hydraulic or pneumatic pumping can drive a motor or turbine with electric generator. Mechanical means can direct drive a generator via rack and pinion gearing, oscillating helical drive or other oscillating linear one or two way rotational motion means. Electrical drive means can be by a linear generator. After compression return and expansion of said containers and its' movable end can be assisted by mechanical (i.e. springs) pneumatic (compressed gas), hydraulic or electric means. Efficiency can be further enhanced by delaying said compression and expansion until hydrostatic pressure is maximized and minimized, respectively via the use of pressure sensors and control valves. Power recovery can occur on either or both strokes. The submerged depth of said containers relative to the sea bed and wave troughs can be hydrostatically sensed and adjusted by a hydrostatic bellows or by hydraulic or electro-mechanical drives for tides to maintain high efficiency by maintaining a relatively shallow submerged depth. The submerged depth can also be increased or the device can be temporarily compressed or locked down during severe sea-states to increase survivability. The stroke or linear motion produced by said container's compression and expansion and applied to said pumping or drive means can be reduced and its' drive force correspondingly increased by use of leveraged connecting means such as rack and pinion or reduction gears, scissor-jacks, linear helical drivers, or lever and fulcrum actuators. High hydraulic pressure can be produced even in moderate sea states by the sequential use of multiple drive cylinders of different sectional areas or by using multi-stage telescoping cylinders. The linear oscillating motion of said container(s) expansion and contraction can be converted into smooth one way turbine, pump, motor or generator rotation via the use of known methods including accumulator tanks, flow check (one way) valves and circuits or mechanical drives, ratchets and flywheels. Mechanically connecting said moving second surface to any floating overhead device, including said floating vent buoy or a floating wave energy converter further increases stroke, energy capture and efficiency. Suitably shaping, inclining (towards wave fronts) and extending the surfaces of said moving second surface provides major additional energy capture. Wave reflection (off a back wall) and focusing also increase both potential (heave) and kinetic (surge and pitch) wave energy capture. The subject device may have a typical diameter and stroke of 5-10 meters and produce 0.25 MW to 1 MW of electrical power. Elongated or multi-unit devices may have major dimensions and outputs of several times that.

Distinguishing Features Over Prior Art

The subject invention provides substantial advantages over the prior art. Van Den Berg (WO/1997/037123), shown in FIG. 1, requires two shallow water sea bed mounted pistons rather than the one of the present invention, separated by an average wavelength. A gas tight chamber is maintained below each piston by a rolling membrane seal. The rolling membrane seal limits stroke and, therefore, energy capture and is vulnerable to frictional wear between the piston and cylinder and near shore debris caught within the seal. The two chambers are connected to two gas accumulator tanks to slightly increase piston travel and rebound rather than utilize the partial evacuation or surface or atmospheric venting of the present invention. The piston connecting rods drive hydraulic pumps which drive a hydraulic motor and generator. Twin chamber devices spaced one average wavelength apart are inherently inefficient as wavelengths are very seldom at their average value. At 0.5 or 1.5 times average wavelength, such devices produce no energy. Submerged shallow sea bed mounted devices must be placed well below the average wave or swell trough depth to survive breaking waves in severe sea-states. Wave induced static pressure differences diminish rapidly with depth in shallow water. Shallow water sea bed mounted devices must be rugged and therefore costly as well as inefficient. Unlike the present invention, depth of sea bed devices can not be adjusted for tides.

Gardner (U.S. Pat. No. 5,909,060) also proposes a twin chamber shallow sea bed device which is essentially two inverted open bottomed cup shaped air entrapped vessels spaced an "average" wavelength apart and rigidly connected by an air duct. One vessel rises as the other falls (like a swing) pumping hydraulic fluid for an hydraulic motor generator. The device is called an "Archemedes Wave Swing." A single vessel open bottom shallow sea bed mounted variant (FIG. 2) is also described, the upside-down air entrapped cup moves up and down in response to overhead wave induced static pressure variations driving a generator with a mechanical or hydraulic drive. Unlike the present invention, which uses an evacuated or surface or atmospheric vented closed vessel, Gardner's up and down movement, and therefore output and efficiency, is restricted because the vessel is not evacuated or vented to atmosphere or an accumulator. The entrapped air is, therefore, compressed thus restricting movement, efficiency, and output. The open bottom also presents problems such as weed fouling and air loss (absorption in water) not encountered in the closed vessel of the subject invention. Shallow water or sea bed mounting also raises costs and lowers efficiency as previously described in Van Den Berg above.

Gardner licensed U.S. Pat. No. 5,909,060 to AWS Ltd. which published an "improved" evacuated enclosed vessel design in November 2007 (as depicted in FIG. 3). Air under partial vacuum is entrapped between a moving rigid (heavy)

inverted cylindrical cup shaped upper vessel (11 in down position, 12 in up position) which slides over a similar slightly small diameter stationary up oriented cup shaped vessel affixed to the sea bed. Partial vacuum is maintained by a "flexible rolling membrane seal" (14 in down position and 15 in up position). To prevent frictional seal wear and binding between the moving and stationary cup, an elaborate marine foulable "ectoskeleton" or frame 16 with rollers 17 or skids is required. The movable inverted cup drives a hydraulic piston 18 providing pulsed pressurized flow on each down stroke. Unlike several embodiments of the present invention, no power is produced on the upstroke which is used to hydraulically return the piston 18 and movable inverted cup 11 and 12 to its' up position 12.

The present invention differs from the published AWS design of FIG. 3 in the following major ways:

1. The flexible elastomer bellows and smaller (plate not cup) light weight (fiberglass) moving surface of the present invention reduces total and moving mass several fold and is, therefore, several fold less costly (light weight flexible (elastomer) sidewalls vs AWS heavy rigid steel overlapping sidewalls). Low moving mass of the present invention greatly increases responsiveness allowing both wave and swell kinetic energy capture vs. the heavy AWS mass for swells only. Low moving mass also allows effective timing, or delayed release, of the compression and expansion strokes until the wave crest and trough, respectively, are overhead preserving precious stroke length until hydrostatic forces are at a maximum (for compression) and minimum (for re-expansion). This "latching" control alone can increase the energy capture efficiency of heaving mode OWECs several fold (see cited references Falnes & McCormick).
2. Certain preferred embodiments of the present invention use direct or indirect atmospheric venting, rather than the partial vacuum used by AWS which may be more difficult to maintain sea water leak free and may compromise hydraulic seals. Partial vacuum also results in some gas compression on the vessel compression stroke which reduces stroke and, therefore, energy capture.
3. Certain preferred embodiments of the present invention utilize overhead surface floating buoys connected to the flexible reinforced bellows container to enhance compression or expansion of said containers or otherwise supplement energy capture.
4. No expensive, heavy, high maintenance, marine debris fouled ectoskeleton/cage with exposed rollers (to maintain concentric cylinder in cylinder movement) is required for the present invention.
5. No "flexible rolling membrane seal" (a fragile high wear, high maintenance item) is required with the present invention. Partial container evacuation combined with hydrostatic seawater pressure draws this seal into the container interior reducing container volume and increasing seal wear.
6. The membrane seal and concentric overlapping cups of the AWS device restricts stroke to less than half that of a present invention device of comparable size, halving cost and doubling energy capture.
7. The "rolling membrane seal" limits the AWS device to a circular horizontal planar section. An oblong section possible with the present invention, may be oriented transverse to the wave front direction (parallel to the waves) and, can capture more energy per unit of horizontal planar area and width. The sides of a circle have very little frontal area and capture.
8. The rigid near shore sea bed attachment post of the AWS device (19 in FIG. 3) does not allow depth adjustment for tides or optimized energy capture or protection from severe sea-states like the adjustable depth mooring systems of the present invention.
9. Embodiments of the present invention use a force multiplier or leveraged connecting means and/or multi-staged or multiple sequenced drive cylinders to increase stroke while maintaining higher capture efficiency than the AWS device (FIG. 3).
10. The device of the present invention, unlike the AWS device, can be oriented vertically (with either fixed or moving surface up), horizontally, to also capture lateral wave surge energy, or in any other orientation.

Burns (2008/0019847A1, 2007/025384/A1, and 2006/0090463A1) and FIG. 4 also describes a submerged sea bed mounted pressurized gas filled cylindrical container 11 having a small diaphragm 39 flexibly connecting a rigid movable top 25, 28 to the top of cylindrical side walls 17. The top and attached small diaphragm move slightly in response to overhead swell induced static pressure changes driving a leveraged 63 hydraulic pump 47. To overcome gas compression stroke limitations, Burns in some embodiments uses multiple adjacent gas interconnected containers, but they are too close to each other to be effective. North U.S. Pat. No. 6,700,217 describes a very similar container and small diaphragm, without gas evacuation, venting or gas interconnection.

The present invention overcomes the limitations of Burns and North in like manner to the AWS/Gardner limitations described in 1-10 above. More particularly or in addition:

1. Neither Burns nor North use surface or atmospheric venting or partial evacuation like the present invention to reduce container gas compressive/resistance and greatly increase stroke and energy capture.
2. Neither Burns nor North or any other submerged vessel prior art use any means before, after on or floating above their vessels to focus or capture any kinetic wave energy representing 50% of all wave energy. Likewise no submerged vessel prior art use a mechanical connection between said submerged vessel and a surface float to increase the stroke and energy capture of said submerged vessel.
3. While Burns and North have less moving mass than AWS, their total mass (and therefore cost) is probably greater due to their heavy walled (11 and 17) ballasted sea bed mounted containers.
4. Burns' and North's small unreinforced diaphragms 29 severely limit their power stroke lengths to a small fraction of the overhead wave height and, therefore, a like small fraction of energy capture rather than a substantial or even majority stroke to wave height ratio of the present invention.
5. Burns' power stroke (and, therefore, energy capture efficiency) is limited by his return means, which uses stroke limiting container internal gas pressure.
6. Burns' attempts to improve his poor stroke and energy capture efficiency in his latest application (2008/0019847A1) by aligning a series of pressurized gas interconnected containers into the direction of wave travel in an "arculated" shape is ineffective in overcoming gas compressive resistance because his containers span less than ½ average wave length.
7. Sea bed mounting of Burns' devices further severely reduces potential energy capture efficiency because sea bed mounting places Burns' movable device tops substantially below average wave trough depth due to tides and severe sea-state device protection considerations.

Wave induced static pressure fluctuations fall off drastically with increased depth in shallow water as previously stated.

Meyerand U.S. Pat. No. 4,630,440 (FIG. 5) shows a submerged sea bed deployed gas filled unreinforced bladder 18 within a larger rigid sea water filled container 26. Meyerand's "bladder in a box" differs materially from the "reinforced flexible bellows" with one fixed rigid end surface and an opposing moving rigid end surface of the present invention. Meyerand's bladder is connected via an air duct to a second shore or surface floating bladder 34. Sea water enters and exits the rigid container 26, in response to overhead wave induced pressure changes on the bladder 18, through a single opening pipe containing a sea water driven turbine-generator. Meyerands '440 suffers the same limitations of near shore sea bed mounted hydrostatic pressure driven devices previously described. The long pneumatic hose 24 between the submerged container 26 with bladder 18 and the shore or surface based bladder 34 produces substantial pneumatic flow efficiency losses. It also reduces the submerged bladder response time limiting energy capture to long swells and not waves. Most significantly, to get Meyerand's "constant pressure" and "constant volume" two bladder system to reinflate when a trough is overhead (Meyerand's only "return means"), the operating "constant pressure" must be extremely high to support and lift the water column above it (45 psi per 100 ft. of water depth). This high "constant pressure", "constant volume" gas needed for submerged bladder inflation severely limits submerged bladder volume changes and energy capture. The present invention does not use high pressure gas within the container and surface vent or bellows as its' return means. The container gas pressure is approximately one (1) atmosphere or lower allowing several times more stroke and energy capture.

Margittai (U.S. Pat. Nos. 5,349,819 and 5,473,892) describes a flexible gas (air) filled submerged (sea bed placed) container which expands and contracts in response to overhead wave induced hydrostatic pressure changes. The rigid top surface is rigidly affixed to and drives a vertical 1 stroke sea water open cycle pump. Unlike the present invention, Margittai does not vent or evacuate his container (he actually "inflates" or pressurizes it to hold its shape against submerged hydrostatic pressure and to provide his only return or re-expansion means, thereby limiting his stroke and wave energy absorption several fold. Margittai uses a simple bladder unreinforced against external hydrostatic pressure, unlike the "reinforced bellows" of the present invention (reinforced against both internal vacuum and external hydrostatic pressure). Margittai relies upon severely stroke and efficiency limiting internal air pressurization for his return means rather than the mechanical or hydraulic return means of the present invention.

DESCRIPTION OF PREFERRED EMBODIMENTS

Figure 1:
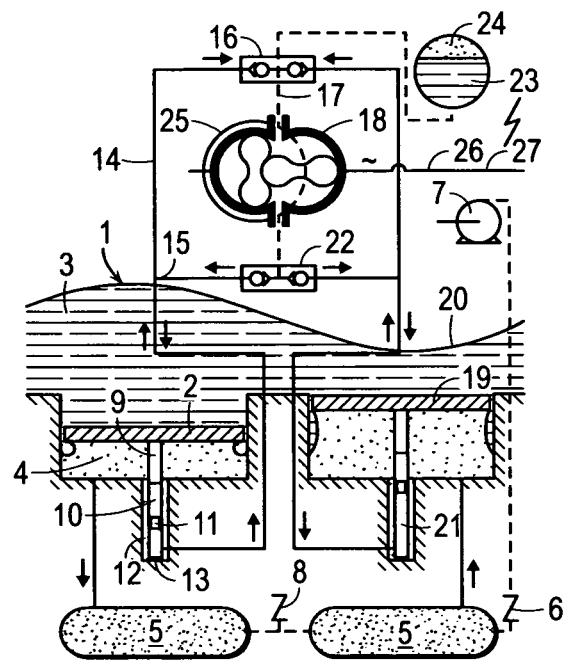
FIG. 1 is a submerged elevation sectional view of the Prior Art by Van Den Berg 1997/037123.
Figure 2:
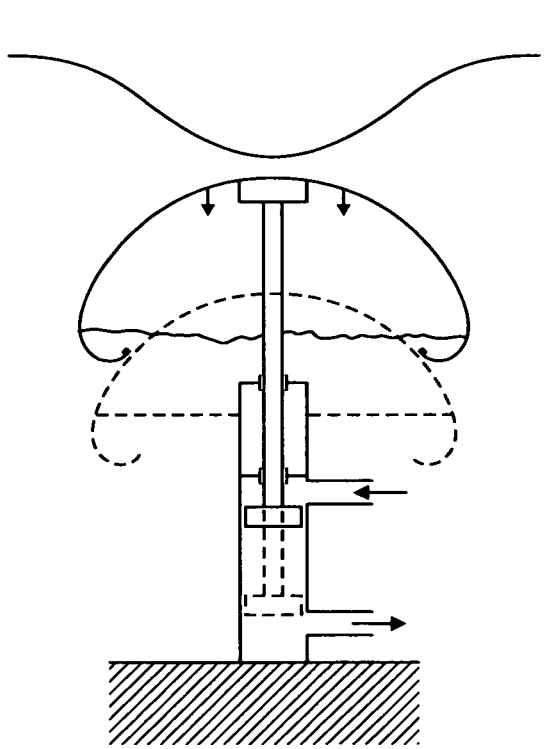
FIG. 2 is a submerged elevation sectional view of the Prior Art of Gardner U.S. Pat. No. 5,909,060.
Figure 3:
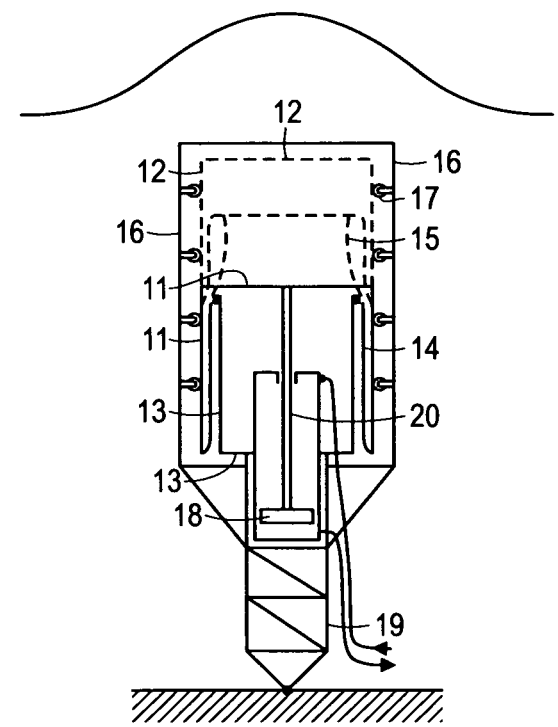
FIG. 3 is a submerged elevation sectional view of the Prior Art of AWS Ltd. as described in the published 29 October-11 November "The Engineer" (pgs. 26 and 27).
Figure 4:
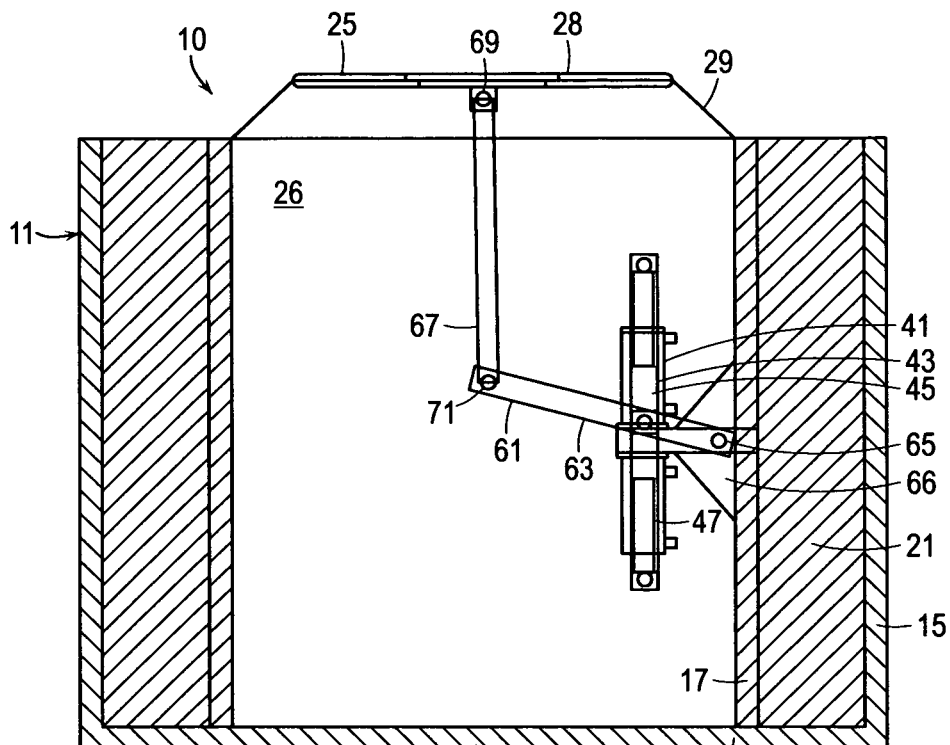
FIG. 4 is a submerged elevation sectional view of the Prior Art by Burns (2008/0019847A1).
Figure 5:
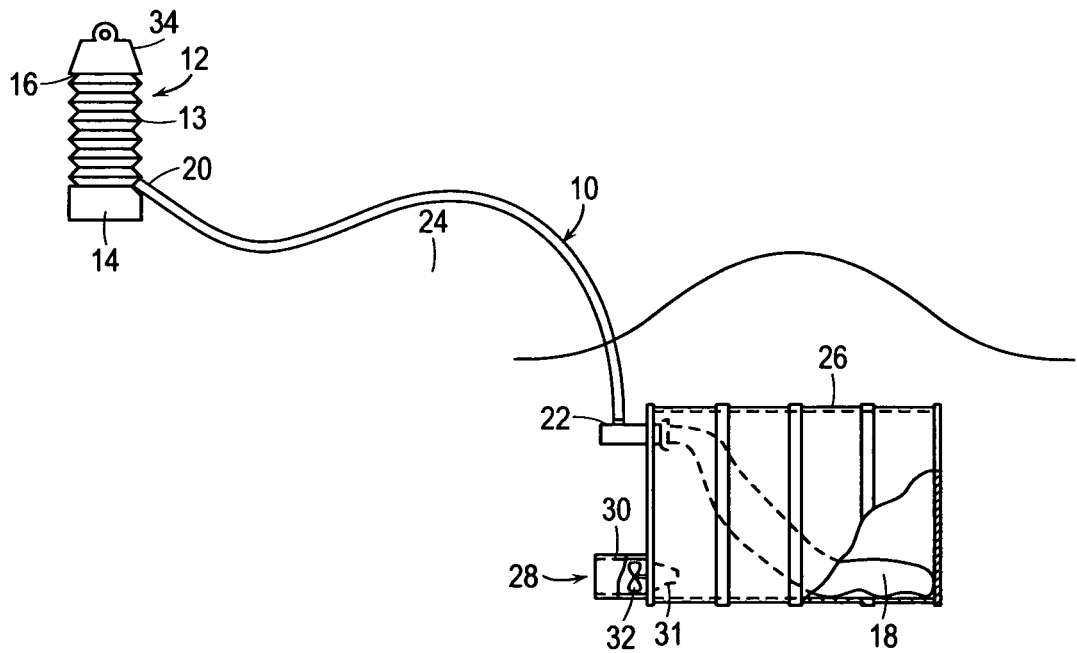
FIG. 5 is an elevation view of Meyerand U.S. Pat. No. 4,630,440.
Figure 6:
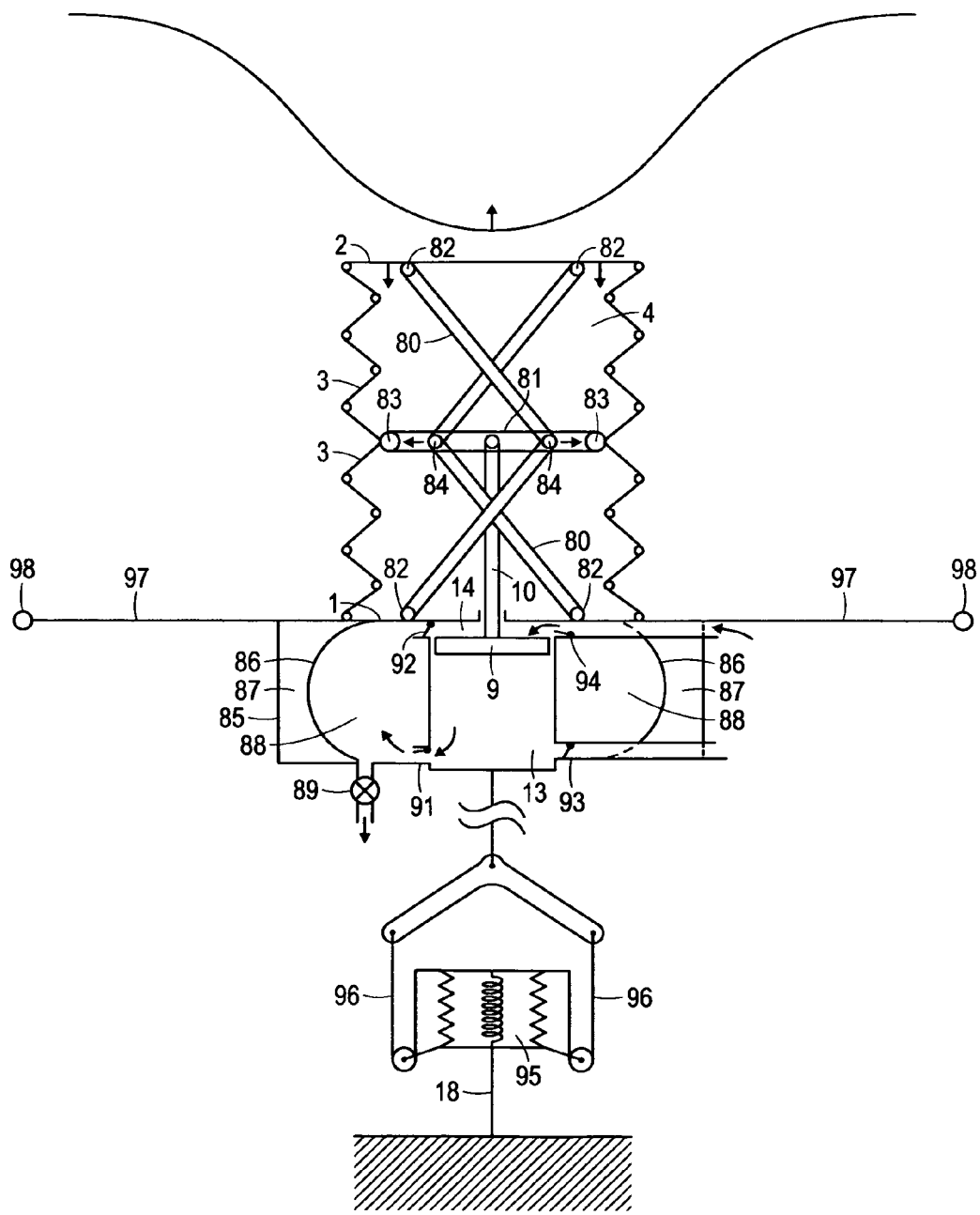
FIG. 6 shows a submerged elevation sectional view of a preferred embodiment of application Ser. No. 12/454,984 (FIG. 15) incorporated herein by reference.

FIGS. 1-5 show prior art previously discussed. FIG. 6 shows a preferred embodiment of U.S. patent application Ser. No. 12/454,984 (FIG. 15) incorporated herein by reference and of which this application is a Continuation-in-Part.

Figure 7:
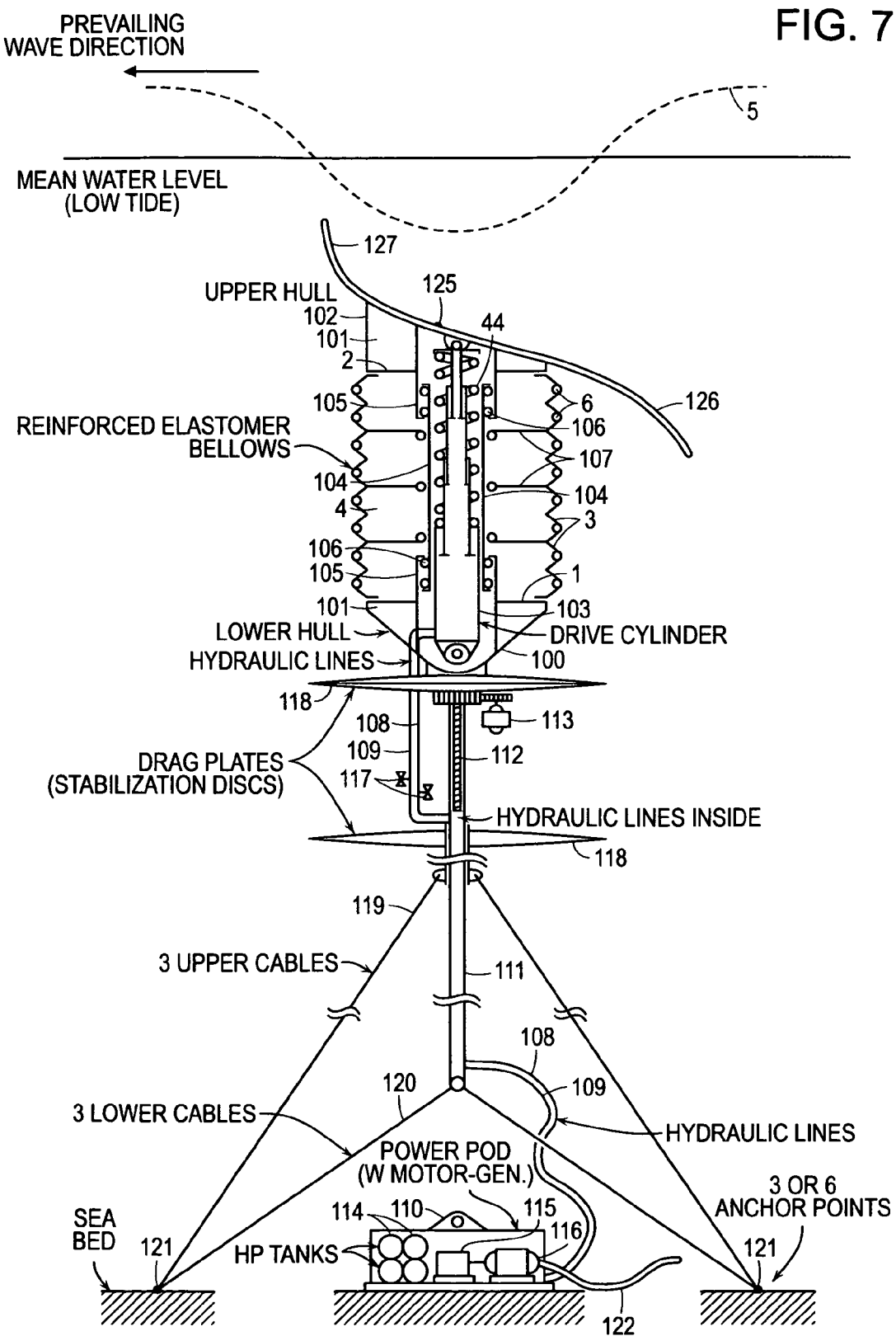
FIG. 7 shows a submerged elevation sectional view of one embodiment of the present invention comprising a vertically oriented partially evacuated or surface vented reinforced flexible bellows container with a said second moving surface extended beyond said bellows top and inclined toward prevailing wave fronts driving a telescoping hydraulic cylinder powering a sea bed hydraulic motor generator. Mooring, tidal depth adjustment, and depth fixing means are also shown.

FIG. 7 shows an embodiment of the present invention similar to FIG. 6. Stationary surface 1 (sealed to a reinforced flexible bellows 3) is part of a molded or fabricated lower hull 100 which may have integral buoyancy chambers 101. Moving surface 2 is part of upper hull 102 which may also contain buoyancy chambers 101 which may also serve as expansion chambers. Flexible bellows 3 is supported against external hydrostatic pressure and, optionally internal partial vacuum, by (internal only) support rings 6. Bellows expansion return is via return spring 44 which return can be assisted or replaced by the 3 stage telescoping hydraulic drive cylinder 103. Bellows internal support rings 66 could be replaced by a helically wound spring (not shown) also serving as said return means. Said bellows 3 and drive cylinder 103 are protected from severe lateral loads and deflection if required by an internal central slide tube or rails sliding within mating tubes or rails 105 in both the top and bottom hulls. Such sliding is facilitated by rollers or bearings 106. The bellows 3 is further supported against lateral or shear loads by cross members 107 also rolling on said slide tube or rails 104. The drive cylinder 103 is hydraulically connected to a sea bed mounted "power pod" 110 via hydraulic lines 108 and 109 passing through a rigid mast or spar 111. Said single "power pod" can service multiple bellows via additional hydraulic lines (not shown). The upper mast 111 houses or supports a tidal depth adjusting jack screw 112 driven by electric or hydraulic jack screw drive 113. Said power pod is sealed against sea water and houses high pressure hydraulic fluid accumulator tanks 114, hydraulic motor 115, electric generator 116, and controls. The hydraulic circuit contains control valves 117 on high pressure supply and low pressure return lines which may be used to delay or time the drive cylinder 103 power (down) stroke and return stroke until the wave crest 5 or trough (shown), respectively, are overhead, for maximum stroke length and energy capture (per Ref. cited and included "latching" by Falnes and McCormick). Fixed surface 1 is held in deep water at a relatively fixed depth by the buoyance of the gas filled bellows container 4 and any buoyance chambers 101 and drag planes, plates or discs 118. Said spar 111 and said container can be held in a relatively vertical position by three or more upper cables 119 and three or more lower cables 120 affixed to three or more anchor points 121. The upper surface 125 of upper hull 102 is inclined toward prevailing waves with the leading extension 126 curving slightly downward creating an "artificial shoal" increasing the wave height above it (and hydrostatic pressure below it) and producing and absorbing supplemental "surge" kinetic energy. The trailing extension 127 curves upward directing waves upward and also reflecting waves back, both also increasing wave height and energy capture.

Figure 8A:
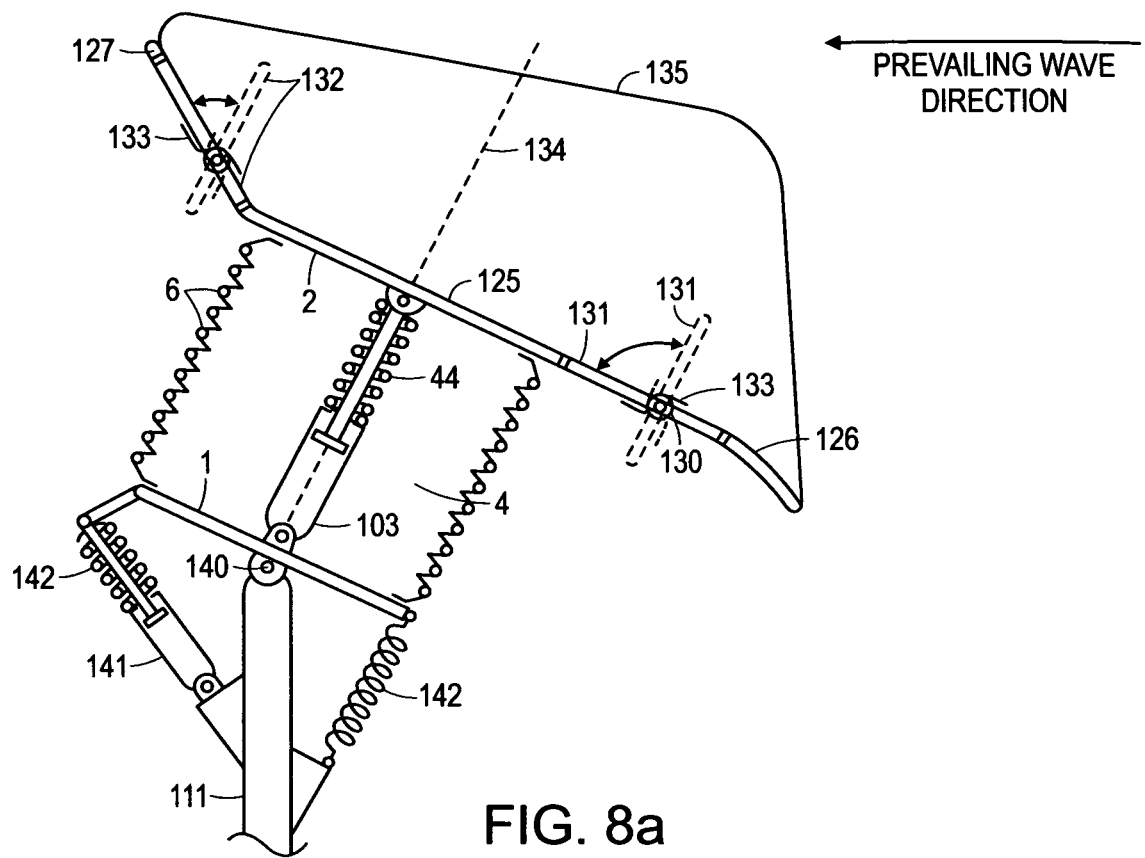
FIG. 8 shows submerged elevation sectional (8a) and plan view (8b) of one embodiment of the present invention comprising an expanded partially evacuated or surface vented reinforced flexible bellows container, said bellows being flexibly inclined toward prevailing wave fronts. Said second moving surface is extended both forward and down (towards oncoming waves) and rearward and upwards for increased wave kinetic energy capture. Said bellows extensions having spring loaded vents or flaps reducing hydrodynamic drag when said second moving surface is re-extended.
Figure 8B:
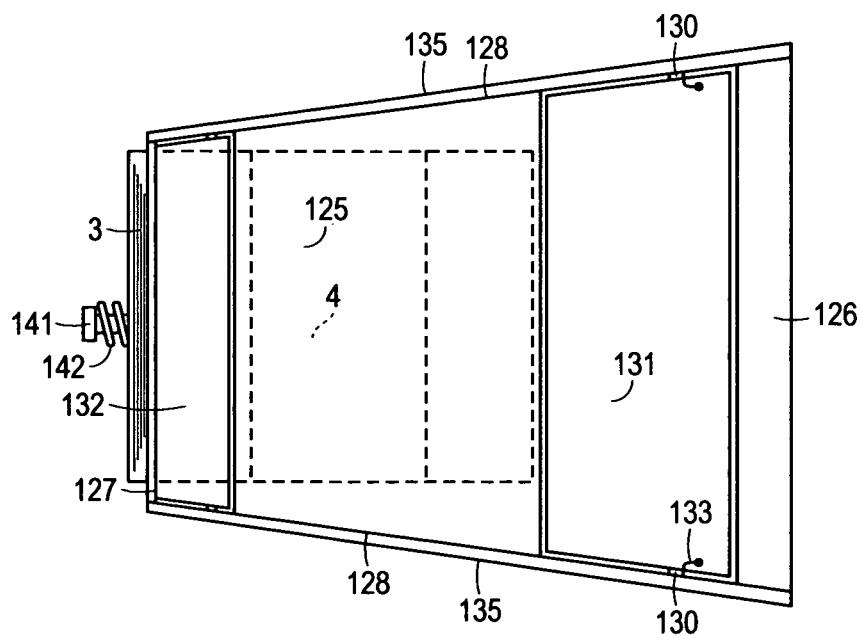

FIG. 8 shows an embodiment of the present invention similar to FIG. 7. Like FIG. 7, upper said moving surface 125 has leading 126 and trailing 127 extensions as well as lateral extensions 128 to increase wave height and capture horizontal (surge) wave kinetic energy component. To reduce the hydrodynamic drag of these extensions, hinged 130 vents or flap panels (131 leading and 132 trailing) are spring loaded 133 about said hinges 130 such that lateral wave particle motion keeps said panels closed when waves move overhead and said bellows containers 4 are compressing and said springs 133 open said panels 131 and 132 when troughs are overhead and said bellows containers 4 are re-expanding reducing return stroke drag losses. Unlike FIG. 7, the central axis of movement 134 of said bellows chambers 4 is rotatably inclined forward about hinge 140 preferably from 20 to 120 degrees (from vertical up), and more preferably from 30° to 90°, to capture a larger portion of oncoming wave horizontal (surge) kinetic energy component which both compresses container 4 and rotates it rearward about hinge 140. Said rotation about hinge 140 compresses supplemental hydraulic drive cylinders 141. Such rotation is restored after each wave surge by return springs 142 on said drive cylinders 141, or spring 143 attached to said fixed mast 111. Such surge component is increased by the "artificial shoal" forward extension 125 which extension should preferably be from 90° to 150° regardless of the orientation angle of said containers central axis of movement 134. Container extended top moving surface 125 also has vertical "side shields" or vanes 135 to prevent oncoming waves piling up on extended surface 125 from prematurely spilling off before driving surface 125 downward. Said side shields 135 are converging providing a wave funneling or focusing effect. Said side shields 135 also keep said bellows container oriented into oncoming wave fronts.

Figure 9:
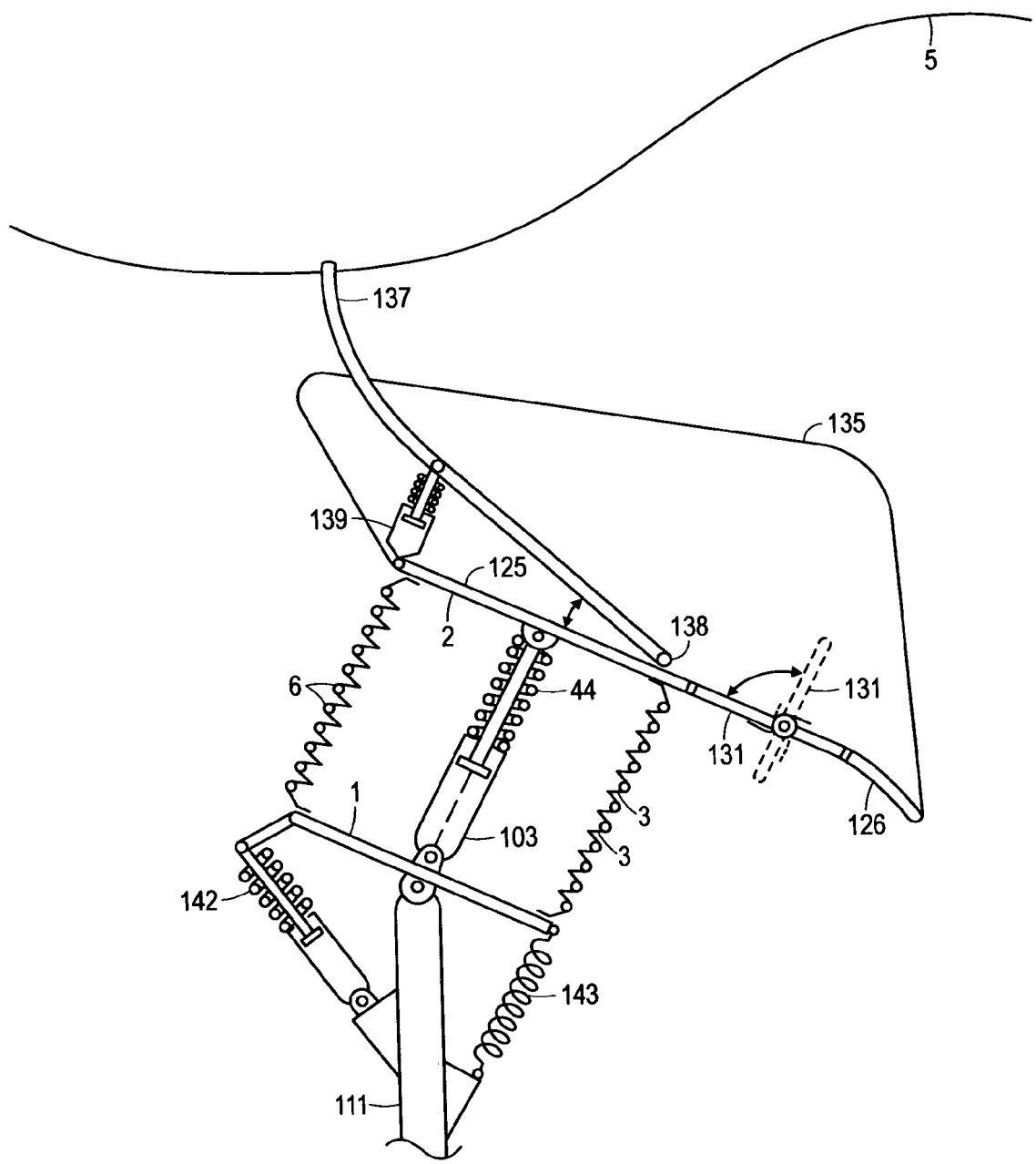
FIG. 9 shows a submerged elevation sectional view of one embodiment of the present invention similar to FIG. 8, but comprising a hinged movable surface over said second moving surface, said hinged surface driving a hydraulic cylinder supplementing the hydraulic drive cylinder within said bellows.

FIG. 9 shows an embodiment of the present invention similar to FIG. 8 except that a movable upper surface 137 curving or extending upwards and rotatably hinged 138 to said moving second surface 125 drives supplemental hydraulic drive cylinder 139 (with optional return spring). Alternatively, said hinged surface 137 could also drive main drive cylinder 103 if its' shaft were extended (and sealed) through surface 125 (not shown).

Figure 10A:
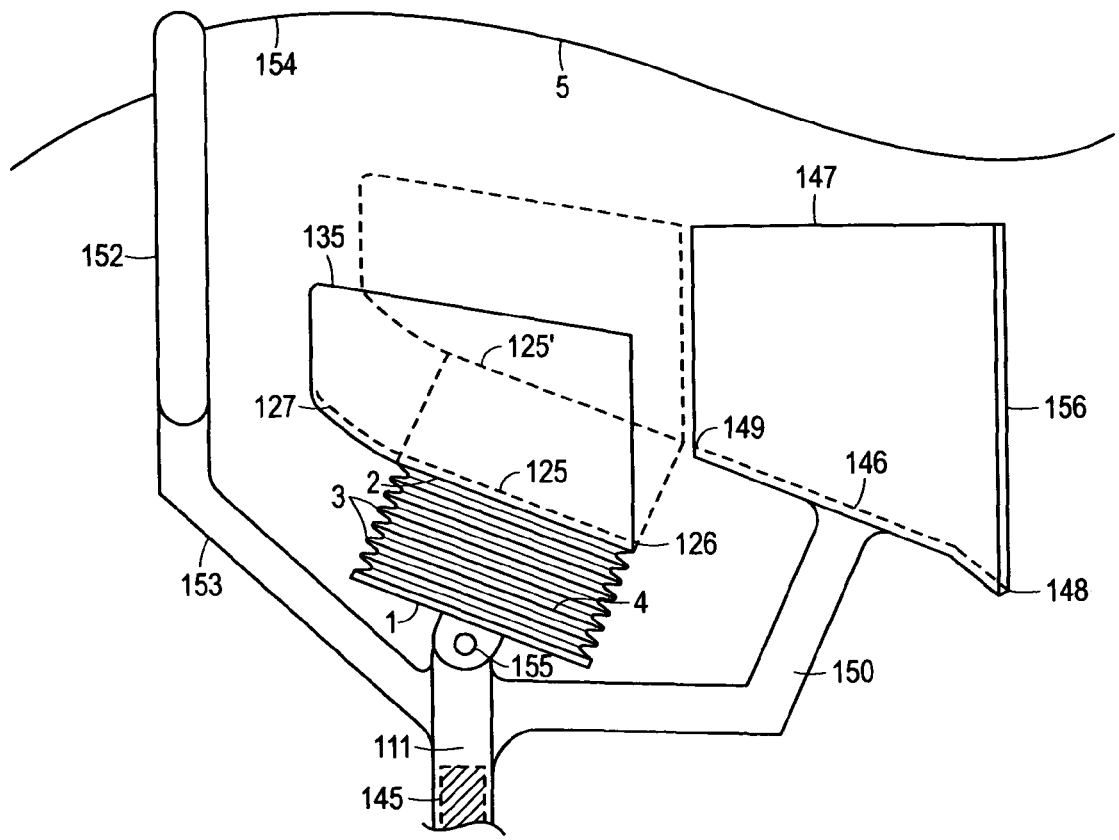
FIG. 10 shows submerged elevation (10a) and plan (10b) views of one embodiment of the present invention comprising a fixed depth inclined shoaling plane in front of said bellows container and a fixed wave reflective wall behind said bellows container, relative to the direction of oncoming waves. Wave funneling and focusing means are also incorporated.

FIG. 10*a* (elevation) and 10*b* (overhead plan view) show submerged embodiment of the present invention similar to FIGS. 8 and 9. Like FIG. 8 or 9, said containers axis of compressive movement is inclined forward. Said container is rigidly attached to the fixed depth mast of spar 111 rather than pivoting (like FIGS. 8 and 9). Said inclination angle can be adjusted by compression bolt 155. Like FIG. 7, said mast or spar 111 has a retractable section 145 allowing the devices above it to be raised or lowered in depth to compensate for tides, average wave height, or severe sea states. The bellows container 3 and mooring system can be of construction similar to that described in FIG. 7. Said bellows container 3 is shown in the compressed position with wave 5 cresting directly overhead. Like FIG. 7, said moving surface 2 has a central section 125, a downward curved leading section 126 (facing toward oncoming prevailing wave fronts) and an upward curving section 127. The fully expanded position of said bellows container 3 and said surfaces 125, 126, 127 are shown as dotted lines. Said moving surface also has vertical side walls 135 as described in FIGS. 8 and 9. Said bellows container 3 is preceded by an "artificial shoaling" surface 146 which is inclined or curved downward which surface acts like a shallow sea bed bottom increasing wave height and converting deep water wave particle circular motion (and wave kinetic energy) into horizontal motion (wave surge motion) for enhanced energy capture by surfaces 125 and 127. Said shoaling surface 146 has generally vertical converging side shields 147. Said surface 146 is wider at its entrance 148 than at its exit 149 near said container downward curved leading section 126. Said shoaling surface entrance 146 also has to relatively flat vertical surfaces 156 or wave refraction surfaces aligned with and extending from shoal entrance 148 all generally parallel to prevailing waves (crests and troughs). Said wave refraction surfaces 156 and shoaling surface converge, focus, or funnel additional wave height and energy on to and in to said bellows moving surface 125, 126, 127 increasing wave energy capture. Said shoaling surface 146 with side shields 147 and refracting surface 156 are fixably mounted by support arm 150 onto said stationary mast or spar 111.

Behind said bellows container 3 is a generally vertical wave reflecting wall 152 affixed to stationary mast 111 by its' support arm 153. Wave crests 154 impacting said wall 152 reflect back over said bellows container 3 further increasing wave height 154 available for energy capture by bellows container 3. Said reflecting wall 152 can be passive (as shown) or "active" if mounted in hinged manner with energy absorbing means (as per FIG. 11).

Figure 10B:
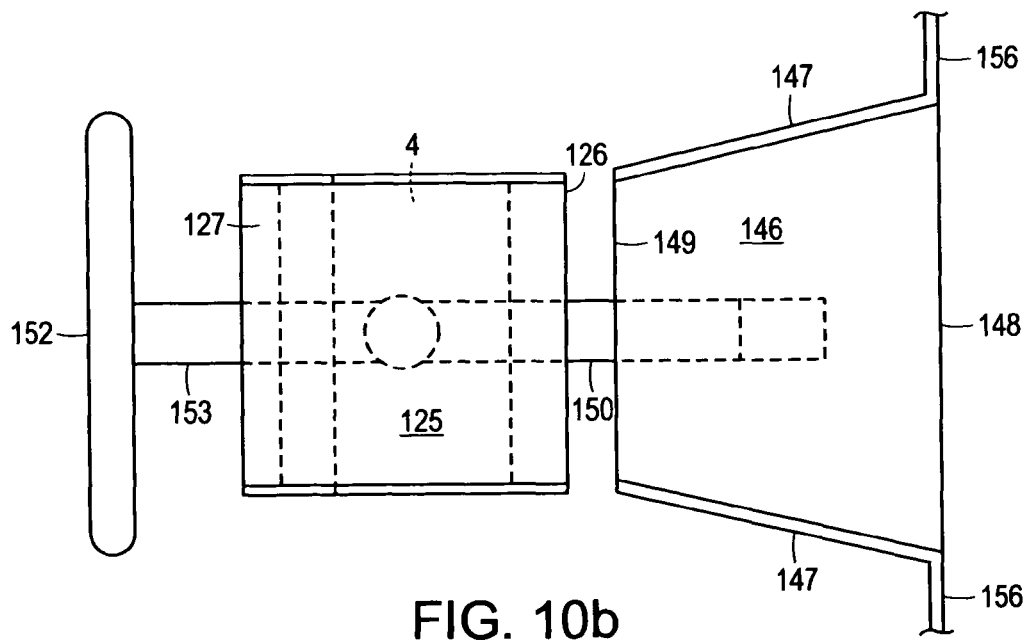
Figure 11:
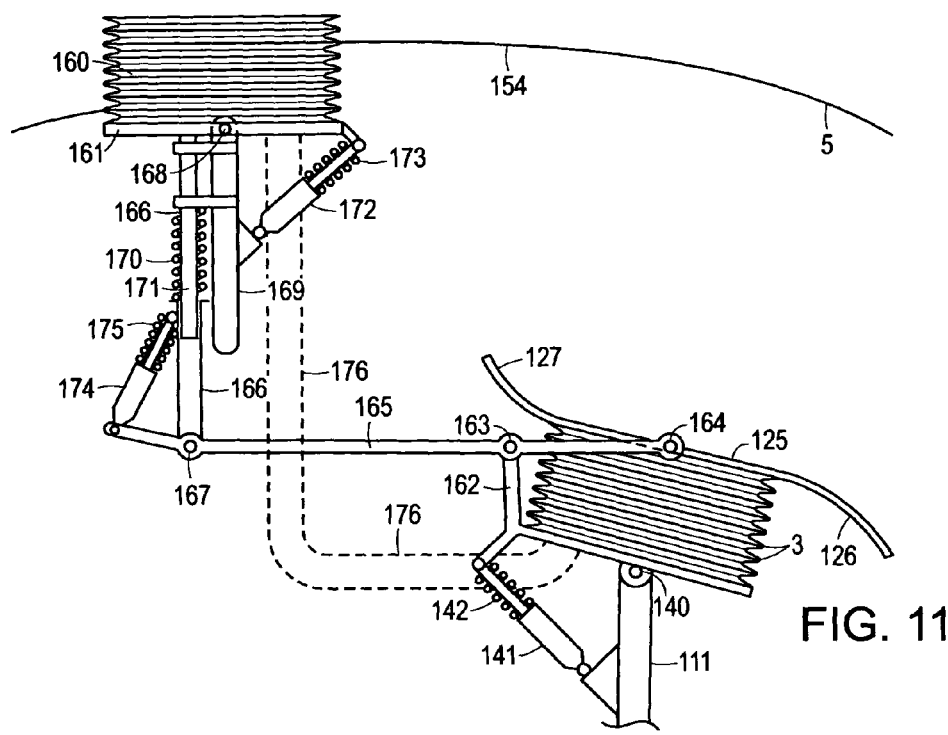
FIG. 11 shows an elevation view of a preferred embodiment of the present invention similar to FIG. 8 except also comprising a floating surface vent buoy mechanically connected through a lever to said submerged container so as to assist in compression and expansion of said container when waves and troughs, respectively pass overhead.

FIG. 11 shows an embodiment of the present invention with forward and rearward extensions of central movable surface 125 like FIG. 7, 8 or 10. It may also be preceded by a fixed shoaling surface (not shown) like 146 of FIG. 10 with similar converging and refraction features. Like FIGS. 8 and 9, said bellows container may be flexibly attached via hinged joint 140 to fixed mast 111 and have supplemental energy absorption means (cylinder 141) with optional mechanical return means (springs 142). Compression and expansion of bellows container 4 is supplemented by surface float base 161 with optional surface vent bellows 160 mounted above said base 161 attached at pivot 168 to said submerged bellows central moving surface 125 by multiple lever arms 165 rotating about fulcrum arm 162 hinge or pivot points 163. The distant end of lever arm 165 is flexibly attached to multiple vertical connecting rods 166 at lower end hinge joint 167. The flexible upper end joints 168 of said connecting rods 166 is attached to said surface float base 161. Like FIG. 10, a wave reflecting wall 169 can be attached to and span between the upper portions of said vertical connecting rods 166. Because surface float base 161 with optional vent bellows 160 will have more vertical movement than said bellows moving surface 125, said fulcrum pivot point 163 will be closer to the bellows pivot point 164 than said connecting rod pivot point 167. For added travel and shock absorption, said connecting rod 166 can have a (spring 170) mounted telescoping section 171. Said bellows float can be fitted with supplemental wave energy (pitch mode) drive cylinders 172 with return springs 173. Said connecting rods 166 bases can also be fitted with supplemental drive cylinders 174 and return springs 175. Reflecting wall 169 is connected to said connecting rods 166. Alternatively, said reflecting wall could be affixed to the surface float base 161. If the optional vent bellows 160 is used on top of the surface float 161, then a flexible gas vent duct 176 is used to allow free gas flow between said submerged bellows container 4 and said floating surface vent bellows 160. If no surface vent bellows 160 is used, the interior of bellows container 4 is partially evacuated to reduce interior gas compression resistance.

Figure 12:
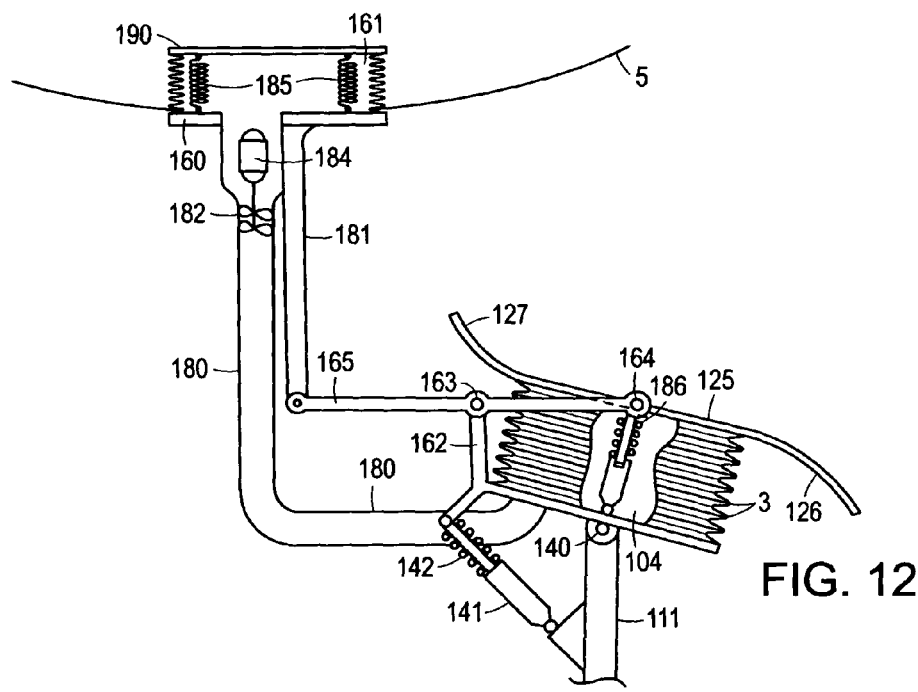
FIG. 12 shows an elevation partial (cutaway) sectional view of an embodiment of the present invention comprising a submerged vertically oriented bellows chamber with extended and inclined moving said second surfaces vented to and lever connected to a surface floating bellows. An air turbine generator produces power from alternating gas flow through a duct connecting said bellows.

FIG. 12 shows a sectional elevation of an embodiment of the present invention utilizing a fixed (shown) submerged inclined bellows container 4 (like FIG. 11) with an adjustable base hinged about pivot 140 with sublemental energy absorption by cylinder 141 and extended and curved bellows top surface (125, 126, 127) (also like FIG. 11). Fixed shoaling surfaces (like FIG. 10) or "active" (powered) wave reflective back walls (like FIG. 11), could also optionally be used. The submerged bellows container 4 is shown expanded with a trough overhead with and a vent surface bellows compressed by return springs 185 or weighted top surface 190. When an ensuing wave crest passes overhead gas from said submerged bellows container 4 flows through duct sections 180, 181 and 182 before passing through two-way air turbine generator 184 and through float base 161 expanding surface bellows 160 and tensioning float bellows return springs 185 or lifting weighted top 190. When the next wave trough passes overhead, the tensioned return springs 185 compress said surface bellows 160 driving gas through said two way turbine generator 184 housed in the base of surface float 161 and then through duct section 180 and back into submerged bellows container 4 re-expanding it and tensioning its' return springs 186. Internal concentric telescoping glide tubes or rails (as described for FIG. 7) can provide lateral stability if needed. Wave reflecting wall 181 can be at least partially hollow and also serve as gas duct 181 or house air turbine generator 184 (not shown). Like FIG. 11, lever arm 165, hinged about fixed fulcrum 163, attaches moving submerged bellows surface 125 at pivot point 164 to telescoping spring loaded connecting rod 166 at attachment point 167.

Figure 13:
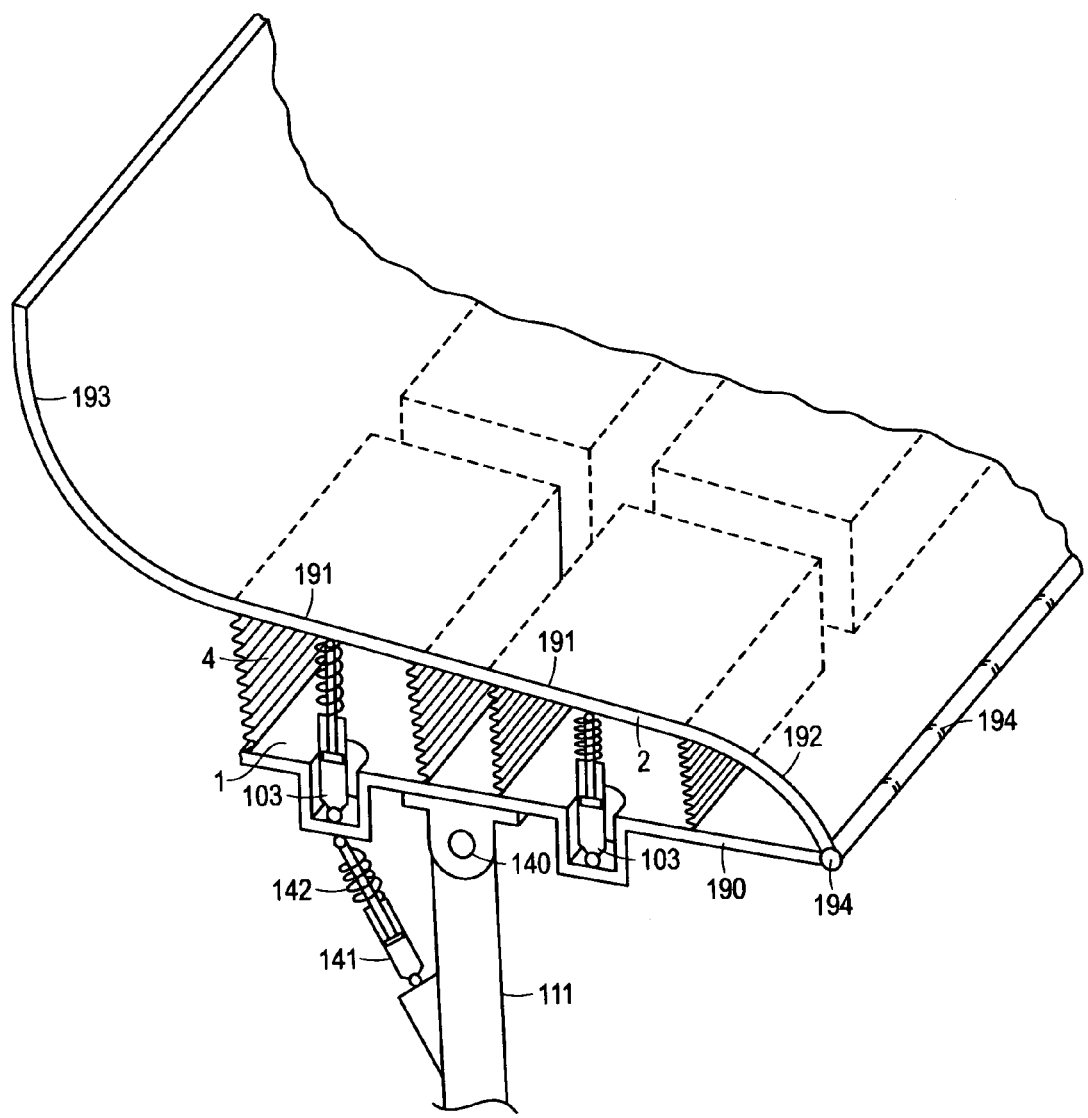
FIG. 13 shows a submerged isometric view of one embodiment of the present invention showing multiple partially evacuated or surface vented elongated flexible bellows containers having common inclined said second moving surface extending both forward (toward oncoming waves) and rearward and common fixed first surface hinged together.

FIG. 13 shows a submerged or semi-submerged embodiment of the present invention utilizing multiple partially evacuated gas tight elongated compressible bellows containers 4 mounted on a common base 190 held at relatively fixed depth by multiple downward masts or spars 111 with depth fixing, adjustment and mooring means as described in FIG. 7. Common (shown) or multiple (not shown) moving upper surface 191 has a forward (oncoming wave facing) downward sloped section 192 optionally flexibly connected to said common base 190 by hinges 194. The rearward upsloping section 193 of said common moving upper surface may also serve as a passive (shown) or active powered (not shown) wave reflector wall increasing wave height, and both hydrostatic and kinetic wave energy capture as previously described. Frontal inclined or downward sloping frontal section 192 acts as a shoaling surface further increasing wave kinetic energy capture as previously described (in FIGS. 7, 8 and 9) or it may be preceded by a fixed shoaling surface (as described in FIG. 10). Base 190 can be hinged 140 to stationary masts 111 as previously described (in FIGS. 8, 9, and 11) with supplemental energy capture by cylinders 141 and return springs 142 or rigidly attached (not shown). Primary energy capture as overhead wave crests compress surface 191 towards base 190 is via hydraulic cylinders 103 with return springs 44 as previously described in FIGS. 7, 8, 9, 11 and 12. Elongated bellows containers as shown have major advantages over round "point source" wave energy absorbs by spanning more wave front per unit of container (or buoy) area or volume. Large containers arranged in series front to back, span a larger portion of each wave length (25% to 50% of total wave length) increasing wave capture efficiency. The hinged front 194 eliminates the need for lateral supports for drive cylinders 103.

Modifications, improvements, and combinations of the concepts described herein may be made without departing from the scope of the present invention.

I claim:

1. A wave energy converting device for extracting energy from a water body with surface waves or swells and troughs comprising:

a. at least one submerged gas tight container under hydrostatic pressure, holding a gas under atmospheric, moderate pressure, or partial vacuum, the container having at least three surfaces, at least one rigid first surface being held at a substantially fixed depth, at least one rigid second surface including any lateral or vertical extensions thereof, wherein the second surface is distant from, does not overlap with, and defines a gap with the at least one rigid first surface, and wherein the at least one second surface is movable relative to the at least one first fixed surface, and at least one flexible third surface spanning the gap and attached to, and defining the at least one gas tight container with the at least one first and the at least one second surfaces, the third surface being flexible over a majority of the length of the gap, wherein the at least one gas tight container is reinforced to prevent collapse inward from the hydrostatic pressure while allowing movement of the at least one second surface relative to the at least one first surface, wherein such movement decreases or increases the volume of the at least one gas tight container and the distance or gap between the at least one first fixed and the at least one second movable surfaces, wherein the decreased or increased distance is caused by increased or decreased hydrostatic pressure as waves or swells and troughs, respectively, pass over the at least one gas tight container, which container's axis of movement may be oriented in any direction;

b. a majority of the at least one third flexible surface is constructed from a structure selected from the group consisting of a thin section flexible metal or plastic bellows, a reinforced flexible elastomer bellows, an accordion pleated bladder, a diaphragm and combinations thereof, wherein the structure has reinforcings selected from the group consisting of a plurality of rigid reinforcing rings, hoops, slats, and other rigid reinforcements oriented generally transverse to the direction of movement between the at least one first rigid surface relative to the at least one second rigid surface, wherein the reinforcings are secured inside the structure and so arranged to withstand the inward collapse of the at least one flexible third surface from a vacuum force or pressure inside the container or, from wave and submerged-depth induced external hydrostatic pressure;

c. at least one surface venting structure selected from the group consisting of surface vent buoys, floating surface expandable bellows, floating surface expandable bladders and combinations thereof, wherein gas in the at least one gas-tight container is under partial vacuum when the at least one container's volume is expanded or the contained gas is in direct or indirect communication with atmospheric pressure through the at least one venting structure, wherein the partial vacuum or venting substantially reduces the compression resisting pressure of the contained gas when the volume of the at least one container is reduced which increases the total wave and trough induced compression and expansion stroke between the at least one first surface and the at least one second surface by reducing the compression and pressure of the gas within the at least one container;

d. a power driver selected from the group consisting of pumps, mechanical drivers, electrical drivers and combination thereof, wherein the pump is selected from the group consisting of hydraulic pumps, pneumatic pumps and combinations thereof, wherein the power diver is for power generation or other uses, and wherein the power driver is within, or in communication with, the at least one container and driven by the relative movement between the at least first and the at least second surfaces, or by the expansion or contraction of the at least one container;

e. a container volume return structure selected from the group consisting of hydraulic, pneumatic, mechanical, electrical, and combinations thereof for returning the at least one container from a decreased volume compressed position to an increased volume expanded position when a wave or trough induced hydrostatic pressure is reduced;

f. a container axis of movement rotation structure selected from the group consisting of flat surfaces, curved planar surfaces and combinations thereof secured to the at least one container to rotate the at least one container forward to oncoming waves to create a forward tilting angle relative to a vertical axis so as to focus, reflect, or retract the oncoming waves onto or over the at least one container to enhance wave energy absorption; and, g. a depth and location fixing structure selected from the group consisting of anchors, moorings, horizontal drag plates secured to a rigid vertical spar, horizontal drag planes secured to a rigid vertical spar and combinations thereof, wherein the combination of the depth and location fixing structure and the at least one container's inherent buoyancy holds the at least one first surface at a substantially fixed location and fixed depth relative to the sea bed or a water body mean water level.

2. The device of claim 1 further comprising a supplemental power driver secured to the at least one container to capture and absorb additional wave energy received when the at least one container rotates about the depth and location fixing structure due to the force imparted by oncoming waves, wherein the forward tilting angle is repeatably decreased upon impact by pivoting with each oncoming wave, and restored between wave impacts when the at least one container rotates about the depth and location fixing structure, wherein, such repeating container rotation or pitching absorbs additional wave energy captured by the supplemental power driver.

3. The device of claim 1 further comprising at least one extension secured to the at least one second surface of the at least one gas-tight container, wherein the at least one extension extends vertically upward from or behind a rearward portion of the at least one second surface opposite the side proximal oncoming waves, the at least one extension oriented generally parallel to oncoming waves, wherein the at least one extension provides a reflective wave barrier or a means of deflecting wave horizontal kinetic energy upward, thereby increasing the wave height and hydrostatic pressure or down force on the at least one second surface thereby increasing the wave energy capture efficiency of the at least one container.

4. The device of claim 3 wherein the at least one extension extends laterally or obliquely downward toward the direction of prevailing oncoming waves such that the at least one extension functions as an artificial shoal or sea bed, increasing the lateral component of each oncoming wave's lateral kinetic energy and increasing each waves height and, thereby increasing the wave energy capture efficiency of the at least one container.

5. The device of claim 1 further comprising at least one extension secured to the at least one second surface, wherein the at least one extension substantially increases the effective surface area impacting oncoming waves beyond a cross sectional area of the at least one container, transverse to the at least one container's axis of expansion and contraction, portions or all of the at least one said extension pivoting or retracting when the volume return structure expands the at least one container, wherein the pivoting or retracting motion of the at least one extension reduces the hydrodynamic drag and energy loss of each return stroke.

6. The device of claim 1 further comprising at least one upwardly or vertically extending surface secured to the at least one second surface normal to or converging front to rear with respect to the prevailing direction of oncoming waves, wherein the at least one extending surface focuses and directs wave induced lateral flow of water over the at least second surface or prevents spillage off the sides of the at least second surface when in an inclined or titled orientation relative to the vertical axis, and wherein the at least one vertically extending surface may maintain orientation of the at least one container into wave fronts.

7. The device of claim 1 wherein the angle between the rotation structure and the at least one second surface is repeatedly reduced upon impact with each oncoming wave, and restored between the impacts by pivoting or hinging between the structure and surface, such relative movement absorbing additional wave energy captured by the supplemental power driver between the structure and surface.

8. The device of claim 1 further comprising at least one shoaling plane secured to the at least one first surface on an end of the first surface proximal prevailing oncoming waves, wherein the at least one shoaling plane, extends laterally or obliquely downwardly toward the direction of the prevailing oncoming waves such that the at least one shoal plane functions as an artificial shoal or sea be increasing the lateral component of each oncoming wave's kinetic energy and increasing each waves height and thereby increasing the capture efficiency of the at least one container.

9. The device of claim 8 wherein the at least one shoaling plane comprises vertical surfaces having portions defining at least one slot, wherein the vertical surfaces extend upwardly from a front end of the plane, wherein the at least one slot of the vertical surfaces have an entrance width greater than the width of the at least one container, wherein the at least one slot funnels or reflects waves into the at least one container, thus focusing oncoming waves on the at least one container via wave diffraction.

10. The device of claim 1 further comprising a vertical wave reflecting barrier surface secured to a frame and aligned parallel to prevailing wave fronts, wherein the reflecting barrier surface is positioned behind the at least one second surface and extends above the at least one second surface towards the water's surface such that at least a portion of oncoming waves are reflected back across the at least one second surface thus increasing by reflection the wave height and, therefore, the stroke and energy absorption of the at least one container, and wherein the vertical wave reflecting barrier may float, heave, surge, or pitch and absorb and convert supplemental wave energy.

11. The device of claim 1 further comprising a floating structure mechanically secured to the at least one second surface, wherein the mechanical structure used to secure the floating structure to the at least one second surface may be the at least one surface venting structure, wherein the floating structure is selected from the group consisting of surface floats, surface floating waver energy converters, surface vent buoys, floating surface expandable bellows, bladders and combinations thereof, whereby force generated by the movement of the floating structure by passing waves and wave troughs is transferred to the at least one second surface and supplements the compression and expansion of the at least one container, which increases or decreases the hydrostatic pressure and lateral kinetic energy which is concurrently compressing or expanding the at least one container.

12. The device of claim 11 wherein the at least one container may function as a pneumatic pump structure driving an air turbine-generator with gas in the at least one container flowing in alternate directions through the at least one venting structure.

13. The device of claim 11 wherein the at least one venting structure may function as part of the pneumatic pump structure in combination with the at least one second surface.

14. The device of claim 1 wherein the power driver provides pressurized fluid to one or more power generators secured within the at least one container, or positioned remotely from the at least one container and in communication with the at least one container via hydraulic or pneumatic lines or ducts, wherein the one or more power generators is selected from the group consisting of hydraulic motors, pneumatic motors, turbines and combinations thereof, and wherein the one or more power generators receive pressurized fluid either directly from the power driver, or from pressurized accumulators or reservoirs for reducing flow and pressure fluctuations to the one or more power generators.

15. The device of claim 1 further comprising a controller and a hydrostatic pressure sensor secured to the at least one container to coordinate the movement of the at least one second surface to wave propagation cycles to maximize each compression or expansion stroke to maximize the energy capture of the at least one container, wherein the controller is configured to delay, hold, or lock the power driver until the optimum time to allow the most efficient compression or expansion stroke of the at least one container.

16. The device of claim 11 wherein the depth and location fixing structure is secured to a sea bed or to at least one cable secured to the sea bed, wherein the at least one cable secures the depth and location fixing structure in a substantially vertical position, and wherein the depth and location fixing structure may comprise drag discs or planes and an elongation adjustment device to adjust the depth of the at least one container.

17. The device of claim 1 wherein the at least one container is configured with a width greater than a depth, wherein the at least one container's major axis extends along the width, wherein the major axis is oriented substantially parallel to prevailing wave fronts and maintained in that orientation with multiple anchoring points or wave induced hydrodynamic orientation structures including vertical or trailing fins.

18. The device of claim 1 comprising a plurality of gas tight containers wherein the plurality of containers are secured to a common anchoring point selected from the group consisting of a fixed single first surface, a single frame, or a single death and location fixing structure.

19. The device of claim 11 further comprising at least one vertically oriented wave reflective barrier float secured behind the at least one container and mechanically secured to the at least one second surface with levers whereby the at least one container is compressed downward when overhead waves lift or vertically heave the at least one barrier float and expand the at least one container when ensuing troughs lower the at least one barrier float, wherein the at least one barrier float is configured and attached to the levers in such manner as to allow the at least one float to rotate, heave, and pitch, whereby such floating, pitching and heaving produces supplemental wave energy captured by a supplemental power driver positioned between the at least one barrier float and the levers.

20. The device of claim 11 wherein the mechanical structure is of variable length and comprises a structure selected from the group consisting of linear mechanical springs, pneumatic springs, hydraulic cylinders, levers, gears and combinations thereof, wherein the mechanical structure permits the floating structure to move greater distances than the at least one second surface so as to allow the at least one first surface to remain at a substantially fixed depth.

* * * * *